J. N. PIERCE & F. L. R. FRANCISCO.
DISTRIBUTING CANOPY FOR ELECTRIC WIRING.
APPLICATION FILED OCT. 29, 1910.

1,053,745.

Patented Feb. 18, 1913.

2 SHEETS—SHEET 1.

Witnesses
Milton Lenoir
E. H. Huney

Inventors,
Joseph N. Pierce and
Ferris L. R. Francisco
By Foree Bain and May
Attorneys.

J. N. PIERCE & F. L. R. FRANCISCO.
DISTRIBUTING CANOPY FOR ELECTRIC WIRING.
APPLICATION FILED OCT. 29, 1910.
1,053,745.
Patented Feb. 18, 1913.
2 SHEETS—SHEET 2.
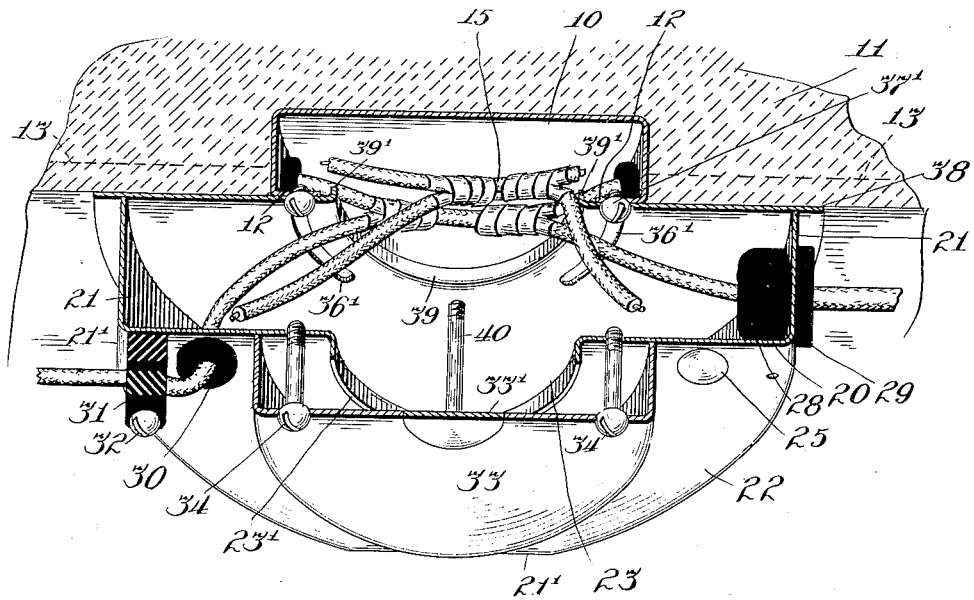
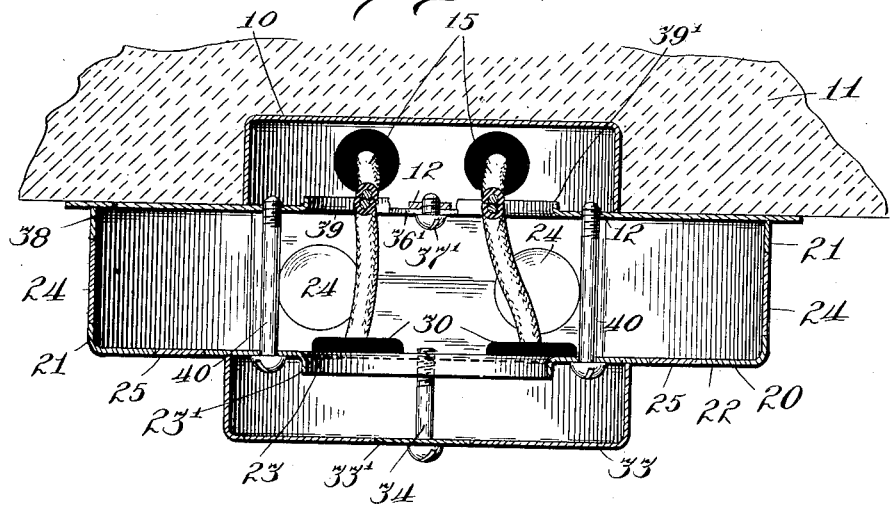
Witnesses
Milton Lenoir
E. H. Henney
Inventors
Joseph N. Pierce
Ferris L. R. Francisco
By Foree Bain and May
Attorneys

UNITED STATES PATENT OFFICE.

JOSEPH NORMAN PIERCE, OF CHICAGO, ILLINOIS, AND FERRIS L. R. FRANCISCO, OF JERSEY CITY, NEW JERSEY.

DISTRIBUTING-CANOPY FOR ELECTRIC WIRING.

1,053,745.

Specification of Letters Patent. Patented Feb. 18, 1913.

Application filed October 29, 1910. Serial No. 589,732.

*To all whom it may concern:*

Be it known that we, JOSEPH N. PIERCE and FERRIS L. R. FRANCISCO, citizens of the United States, respectively residing at Chicago, in the county of Cook and State of Illinois, and at Jersey City, in the county of Hudson and State of New Jersey, have invented certain new and useful Improvements in Distributing-Canopies for Electric Wiring, of which the following is a specification.

Our invention relates to improvements in distributing canopies for electric wiring, and has for its general object to provide a distributing-canopy fitting for association with an outlet or wall box, to accommodate the distribution of electric wiring connections radiating or diverging from such outlet box to translating devices, such as drop lights, small motors, and the like.

Figure 1:
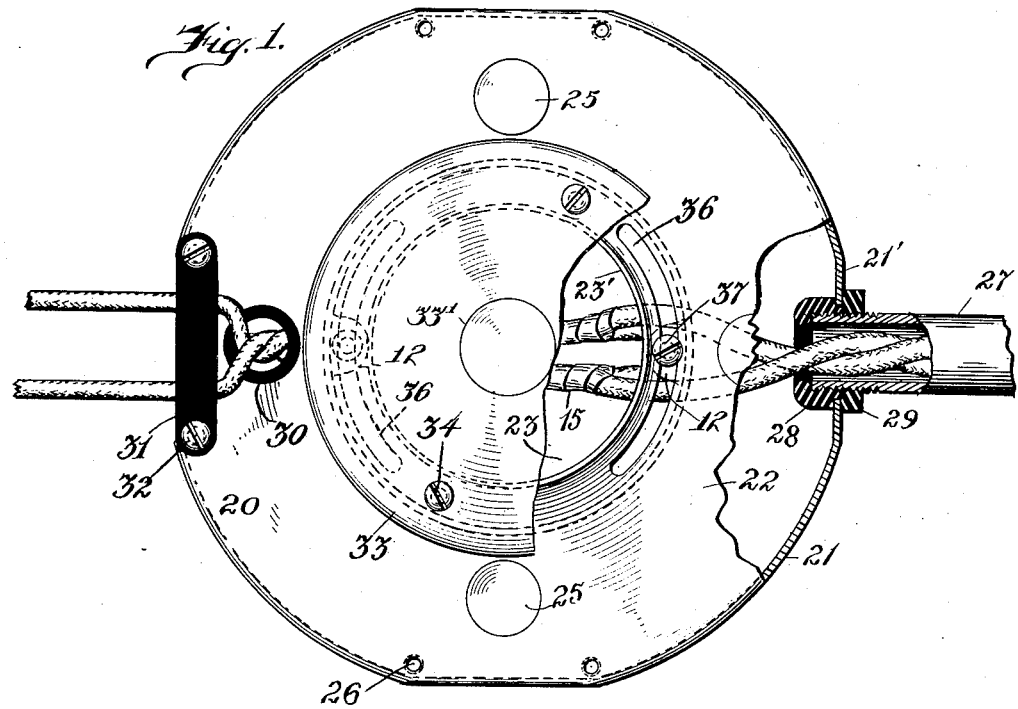
Figure 2:
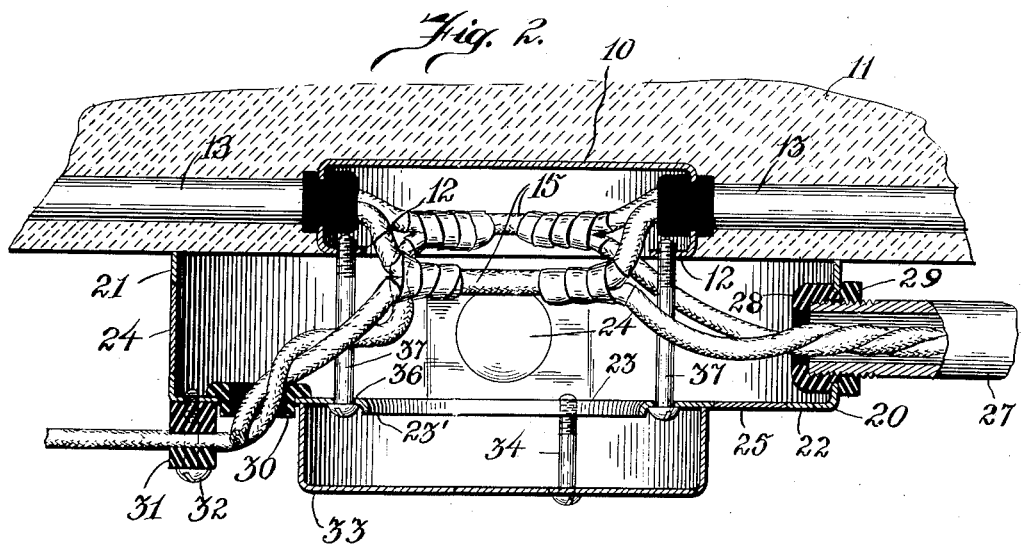

In the drawings, Figure 1 is a plan view from below with parts broken away, showing one embodiment of our invention; Fig. 2 is a vertical cross section taken centrally therethrough; Fig. 3 is a sectional perspective of a modified embodiment of our invention; and Fig. 4 is a vertical cross section therethrough taken at right angles to the section of Fig. 3.

In the drawings, 10 indicates, in general, an outlet box for suitable connection with any building structure, shown as set in a surfacing body, 11, of cement, plaster, or the like, forming the ceiling of a room. The box has inturned ears, 12—12, such as are customarily used for the attachment of a cover plate, and suitable ones of its customary "knock-out" openings communicate with conduits, 13—13, shown as embedded in the material body 11 to afford a duct for the passage of electric mains or branches, 15, to the outlet. Such parts thus far described are intended to illustrate conventionally matters of well known electrical construction.

In installing electrical distribution systems,—as for example in making provision for electric lighting of shops, or other large rooms which require an irregular distribution of individual lights or other translating devices,—it is customary to provide outlet boxes at regular intervals upon the ceiling, or in the walls, and to run local wires along the ceiling or wall to points of utilization, such locals often radiating or diverging in all directions from the box. When the wiring arrangement has been completed, the outlet box is sometimes left open, exposing the electrical connections, or is housed, at considerable expense and with much trouble, by extemporizing a closure adapted to the particular conditions existing at such box.

Our invention provides a cheap, effective, and finished structure for facilitating such distribution of local wires, protecting and concealing the joints in the outlet box, and making the outlet box easy of access.

In general, we provide a canopy body, generally of sheet metal, arranged for attachment to the cover receiving ears of the outlet box, and of considerably larger area than the outlet box. Thus, our structure provides as a main member or body, a box 20, preferably of sheet metal, comprising a circumferential wall, 21, and an annular head, 22, having a central opening, 23, preferably surrounded by a strengthening lip 23'. Suitable apertures are provided in the edge wall, and head wall, respectively, normally closed by the knock-out plugs 24 and 25, to be dislodged therefrom by a blow. Preferably the knock-outs 24 and 25 in the head and peripheral walls are in radial line, and wall 21 is preferably flattened as at 21', adjacent each knock out 24, to facilitate the punching of the knock out plug, the fitting of conduit ends thereto, and also to harmonize the shape of the body 20 with such cleats as may be employed in conjunction with the head knock outs 25. Thus, in the head adjacent each flattened area, 21', we provide apertures, 26, for the reception of the screws or bolts of wiring-cleats of a standard size to conform to the straight edge of the flattened portion 21'.

In effecting connection of exposed conduits with the canopy body, suitable ones of the openings in the peripheral wall may be cleared of the knock-out plug 24, and conduit members 27, secured in the openings by the usual bushings and lock nuts 29; whereas when it is desired to run the local wiring on cleats, suitable ones of the outlet openings in the head 22 may be cleared of their plugs 25, bushed with appropriate bushings 30, and branch wiring run through the cleats 31, of well known form, secured upon the head 22, as by screws or bolts 32, engaging in the apertures 26 aforesaid.

The large central opening 23 in the head 22 is overlaid by a cover or cap, 33, preferably of cup form, preferably formed of sheet metal and of diameter somewhat greater than that of the opening 23. Such cap, 33, is secured to the head 22, by screws, 34, extending through the cap and engaging the head just beyond the aperture 23. Obviously, the removal of the cap gives direct access to the interior of the canopy, and outlet box, and while the cap is in place, the canopy body is substantially sealed. Preferably, a knock-out plug, 33′, is provided in cap 33, so that the cap may readily be fitted with a drop cord or the like.

For attaching the canopy body to the ears 12 of the outlet box, we provide suitable means involving arcuate slots in a horizontal plate of the detachable structure, said slots receiving screws which engage the outlet box ears, and said screws serving, when tightened, to clamp the detachable structure in any desired position of rotary adjustment about its axis. In practice, it is preferable in some instances to employ a metallic base plate to lie between the ceiling and the edges of the wall 21, as, for instance, where the ceiling 11 is of wood and plaster construction, but in other instances, the edge wall 21 may directly coöperate with the ceiling 11, as where the ceiling is of cement, metal, or other fire-proof material. In the specific construction shown in Fig. 2, where no base plate is employed, the head 22 constitutes the horizontal planar member of the detachable canopy structure which is provided with arcuate slots 36, each preferably of about 90° in extent, located close to the lip 23′ of opening 23, and receiving the long screws 37, which directly engage threaded apertures in the ears, 12, of the outlet box. Obviously, when such screws are tightened, they clamp the edges of the wall 21 of canopy 20 closely against the ceiling 11 and retain the removable canopy in predetermined set position, so adjusted that the outlets face in desired direction, the heads of the screws 37 themselves being covered by the cap 33, and thereby protected against tampering or accidental loosening. In the construction shown in Figs. 3 and 4, a base plate 38 is provided to lie between the ceiling 11 and the edge of wall 21, of the canopy body, said plate being of somewhat greater diameter than the canopy body, and having a central opening 39, registering with the outlet box, and surrounded by an upturned lip 39′ to enter the outlet box inside of the ears 12. Such base plate, when used, as connected to the body part of the removable structure by screws 40, located preferably at a radial distance from the center of the body less than the radius of the outlet-box wall, as indicated in Fig. 4, the base plate 38 having made therein the arcuate openings, 36′, to receive short screws, 37′, effecting connection for rotary adjustment between the detachable canopy structure and the ears of the outlet box.

In practice, in equipping a manufacturing building, or the like, we preferably wire each outlet box for the capacity of as large a number of lamps as may possibly be needed within the area to be supplied by the outlet, and thence to distribute, through the canopy, such branch connections as are immediately needed. Obviously, from time to time, any number of connections up to the maximum may be added to meet the requirements of increased illumination.

While, for convenient illustration, the canopy is herein referred to particularly in its use in electric lighting installations, it will be obvious that its use is not limited in this regard, and that its structure may be varied in details of construction and arrangement without departure from the spirit of our invention and within the scope of the appended claims.

Having described our invention, what we claim as new and desire to secure by Letters Patent, is:

1. The combination with an outlet box, of a canopy detachably secured thereto comprising a hollow body of larger diameter than the outlet box, having an opening in its head, and outlets in its walls; a cover for said head opening, and means for attachment of said body to the outlet box at a plurality of separated points, said attaching means having rotarily-shiftable connection with one of said parts to permit limited rotary adjustment of the body relative to the box.

2. The combination with an outlet box, of a detachable canopy structure, comprising a body having outlets in its walls and a head opening; a detachable cover for said head opening; and means for attaching said canopy to said outlet box for angular adjustment about its axis, comprising screws engaging the outlet box and seated in arcuate slots in a plane portion of the canopy structure.

3. The combination with an outlet box providing inturned ears, of a detachable distributing canopy comprising a body of larger diameter than the outlet box, having side walls and an annular head, said body having outlets therein; a cap overlying the opening of the annular head; means to retain said cap; and means to connect the detachable canopy structure with the ears of the outlet box, comprising screws engaging said ears at their threaded ends, and at their headed ends engaging arcuate slots in a planar portion of the canopy structure.

In testimony whereof we hereunto set our hands.

JOSEPH NORMAN PIERCE.
FERRIS L. R. FRANCISCO.

In the presence of—
 MARY F. ALLEN,
 W. LINN ALLEN.